(12) United States Patent
Mohan et al.

(10) Patent No.: US 11,358,845 B1
(45) Date of Patent: Jun. 14, 2022

(54) ELECTROMAGNETIC NOISE CANCELLATION APPARATUS FOR CABLE DEPLOYED AT VARYING LENGTH

(71) Applicant: AMAZON TECHNOLOGIES, INC., Seattle, WA (US)

(72) Inventors: Akshay Mohan, San Jose, CA (US); Jagan Vaidyanathan Rajagopalan, San Jose, CA (US); Yue Zheng, Santa Clara, CA (US); Deepak Pai Hosadurga, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 723 days.

(21) Appl. No.: 16/355,397

(22) Filed: Mar. 15, 2019

(51) Int. Cl.
   *H04B 1/10* (2006.01)
   *B66F 9/08* (2006.01)
   *H04B 1/04* (2006.01)
   *H01Q 1/10* (2006.01)
   *H01Q 13/20* (2006.01)
   *H04B 3/32* (2006.01)

(52) U.S. Cl.
   CPC ............... *B66F 9/08* (2013.01); *H01Q 1/10* (2013.01); *H01Q 13/203* (2013.01); *H04B 1/0475* (2013.01); *H04B 1/1027* (2013.01); *H04B 3/32* (2013.01)

(58) Field of Classification Search
   CPC ...... H04B 1/1027; H04B 3/32; H04B 1/0475; B66F 9/00; B66F 9/08
   USPC .................. 375/254, 257, 285, 295
   See application file for complete search history.

(56) References Cited

U.S. PATENT DOCUMENTS

| | | | |
|---|---|---|---|
| 10,100,968 B1* | 10/2018 | Chow | E04C 3/005 |
| 2011/0054690 A1* | 3/2011 | Gal | H01Q 3/06 |
| | | | 343/757 |
| 2011/0196581 A1* | 8/2011 | Zurfluh | H01Q 1/18 |
| | | | 701/49 |
| 2014/0062806 A1* | 3/2014 | Higby | H01Q 3/01 |
| | | | 439/13 |
| 2018/0050634 A1* | 2/2018 | White | A47L 9/30 |
| 2020/0029054 A1* | 1/2020 | Ellis | G05D 1/0225 |
| 2020/0180142 A1* | 6/2020 | Chow | B25J 18/04 |

\* cited by examiner

*Primary Examiner* — Emmanuel Bayard
(74) *Attorney, Agent, or Firm* — Lindauer Law, PLLC

(57) ABSTRACT

A device such as an autonomous mobile device may include an extensible mast or other structure that changes length during operation. A cable between electronics at the ends of the structure includes a data line for signals and a power line for electrical power. A deployed length of the cable is determined and used to determine the phase of an antinoise signal that is radiated using the power line. The antinoise signal destructively interferes with at least a portion of the radiated noise from the data line, reducing the overall amplitude of the radiated noise. The deployed length may also be used to adjust other parameters, such as equalizer settings for one or more of a transmitter or receiver that is connected to the data line.

20 Claims, 8 Drawing Sheets

ELECTROMAGNETIC NOISE CANCELLATION APPARATUS FOR CABLE DEPLOYED AT VARYING LENGTH

BACKGROUND

Electronic devices may utilize signals at one or more frequencies during operation. Unintentional signals, such as radiated electromagnetic noise, may produce unwanted effects in those or other devices. Reduction in the emission of unintentional signals is desirable to minimize these unwanted effects.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
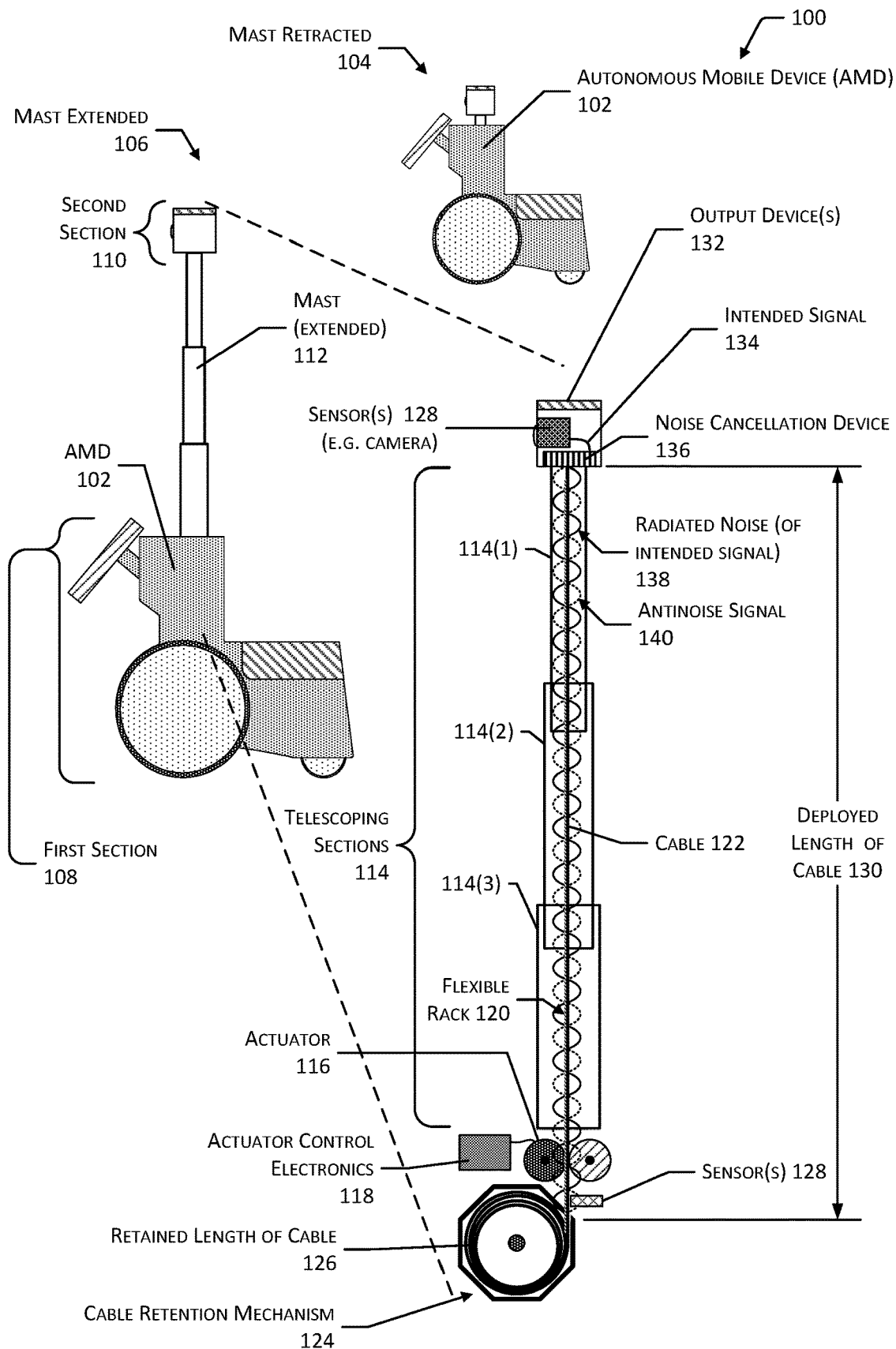
FIG. 1 illustrates an autonomous mobile device, such as a robot, which includes an extensible mast with a cable therein and a noise cancellation device to reduce radiated electromagnetic noise, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device (AMD), such as a robot, may perform various tasks. The robot is capable of autonomous movement, allowing it to move from one location in the environment to another without being "driven" or remotely controlled by the user or other human. Some of the tasks the robot performs may involve the robot moving about an environment. Tasks may be initiated at user request, may be preprogrammed, or may be determined to be performed autonomously.

The AMD may include a first section, such as a chassis or main body that includes motors, computing devices, sensors, and so forth. In some situations, it may be advantageous to position a second section which includes a payload such as sensors, output devices, or both, at various distances from the first section of the AMD. For example, it may be useful for a camera of an AMD to be able to see what is on a table or look out a window.

An extensible mast may be utilized to position the second section at a desired distance from the first section of the AMD. The extensible mast may comprise a set of telescoping sections. The mast may be extended using one or more actuators. In one implementation a motor moves a flexible rack between a first spool and the extensible mast. As more of the flexible rack is dispensed from the first spool to the extensible mast, a force is exerted longitudinally along the flexible rack and to an upper portion of an uppermost section of the telescoping sections. This force pushes the sections of the extensible mast upwards. To lower the mast, the process is reversed and the flexible rack is returned to the first spool. In one implementation, the flexible rack may have teeth along one side. A motor-driven pinion engages the teeth on the flexible rack, moving the flexible rack. In another implementation, the motor may turn a friction wheel that engages the flexible rack. Continuing the example, the extensible mast may be used to lift the second section which contains a camera so that the camera is able to view the tabletop.

A cable within the extensible mast provides connectivity between the electronic circuitry near the ends of the mast. The cable includes two or more electrical conductors. For example, the cable may provide a first electrical conductor to transfer an intended signal produced by a transmitter having a transmitter output in the second section to a receiver in the first section and a second electrical conductor to transfer electrical power from the first section to the second section.

As the extensible mast is extended and retracted, an overall distance between the first section and the second section changes. For example, at maximum extension of the mast the distance between the first section and the second section may be 90 centimeters (cm) while at minimum extension the distance is 10 cm. A retained length of cable is stowed by a cable retention mechanism while a deployed length of cable extends between the first section and the second section. The overall length of the cable remains the same.

The cable retention mechanism may comprise an enclosure, bobbin, spool, or other device that facilitates stowage and deployment of the cable as the overall distance changes.

One or more sensors provide output indicative of length data. The length data may be indicative of one or more of a deployed length of cable, a retained length of cable, and so forth. In one implementation, the sensors include a motor encoder on the actuator used to raise and lower the mast. The motor encoder may provide data indicative of a number of rotations and direction of rotation that may then be used to determine length data. In another example, an optical sensor in the first section may sense the cable as it moves past to determine the length data. In yet another example, the cable may include markings that are representative of particular lengths, and the sensor may read these markings to determine the length data.

During operation of the device some of the intended signal being transferred by the first electrical conductor in the cable may "leak" as radiated noise. For example, the cable may include a shielded coaxial cable in which the first electrical conductor comprises the central conductor surrounded by a shield. For a variety of reasons, the shield may not be completely effective, resulting in at least a portion of the intended signal radiating into the surrounding environment.

Changes in the length of the cable as deployed or retained produce changes in the electrical characteristics of one or more of the electrical conductors in the cable. For example, the portion of the cable that is retained may be coiled, increasing the inductance of the one or more electrical conductors in the cable. Continuing the example, the portion of the cable that is coiled will exhibit a different inductance than the portion that extends between the first section and the second section. Changes in the electrical characteristics may affect the radiated noise, increasing or decreasing the amplitude, changing where along the cable the radiated noise exhibits a greatest amplitude, and so forth.

Described in this disclosure is a noise cancellation device that generates an antinoise signal based at least in part on the length data and an intended signal that is transferred to a first electrical conductor. A portion of the intended signal being transferred by the first electrical conductor produces radiated noise. The phase of the antinoise signal differs from the phase of the intended signal. The antinoise signal is transferred to a second electrical conductor in the cable which radiates the antinoise signal. The antinoise signal destructively interferes with at least a portion of the radiated noise along the cable, reducing the overall amplitude of the radiated noise. By using the length data, the system is able to adjust for the electrical and positional changes introduced by changes in the physical arrangement of the cable.

In one implementation the noise cancellation device may be in the second section. In another implementation, the noise cancellation device or a portion thereof may be located along the cable between the first section and the second section. For example, a particular portion of the cable may be associated with the radiated noise. The noise cancellation device may be located at or near the particular portion and transfer the antinoise signal to the second electrical conductor proximate to the particular portion.

Also described is modifying signal equalization based on the length data. The electronic circuitry in the second section may perform equalization, selectively amplifying or attenuating different frequency bands in the intended signal prior to transfer to the first electrical conductor in the cable. Equalization may be performed at a transmitter to reduce intersymbol interference at the receiver. As described above, the length of cable that is deployed or retained changes and may change the electrical characteristics of the first electrical conductor. In one implementation equalization parameters indicative of the amplification or attenuation to be applied to one or more frequency bands may be based on the length data. For example, a first set of equalization parameters may be used when the mast is fully retracted and most of the cable is stowed while a second set of equalization parameters is used when the mast is fully extended and most of the cable is deployed.

Illustrative System

FIG. 1 illustrates an autonomous mobile device (AMD) 102, such as a robot. During operation, the AMD 102 may perform various functions such as moving about the environment, interacting with users, performing tasks, and so forth.

The AMD 102 is shown with a mast retracted 104 and a mast extended 106. The AMD 102 may include a first section 108 and a second section 110. The first section 108 may house various components such as sensors, wheels, motors, batteries, processors, and so forth. These components are discussed in more detail below with regard to FIGS. 5 and 6.

The second section 110 is joined to the first section 108 by an extensible mast (mast) 112. In this implementation, the mast 112 is able to extend upwards and is stowed at least partially within the first section 108. The mast 112 may be used to elevate the second section 110 relative to the first section 108.

The mast 112 comprises a plurality of telescoping sections 114(1)-(3) that are nested at least partially within one another. In the implementation shown here, an uppermost portion of the telescoping section 114(1) is attached to the second section 110. Telescoping section 114(1) nests within telescoping section 114(2), which in turn nests within telescoping section 114(3). A lower portion of the telescoping section 114(3) is attached to the first section 108. In other implementations the mast 112 may comprise other structures. For example, the mast 112 may comprise one or more strips of flexible material, a scissor lift, elastomeric material, inflatable chambers, interconnected links, and so forth.

An actuator 116 controlled by actuator control electronics 118 operates to extend or retract the mast 112, moving the second section 110 relative to the first section 108. For example, the actuator 116 may comprise a motor that dispenses a flexible rack 120 that moves one or more of the telescoping sections 114 relative to one another.

A cable 122 provides connectivity between the electronics in the first section 108 and the second section 110. The cable 122 includes two or more electrical conductors. In one implementation the cable 122 may be separate from the flexible rack 120. For example, the cable 122 may be stowed separately from the flexible rack 120. In another implementation, the cable 122 and the flexible rack 120 may be incorporated into a common assembly.

A cable retention mechanism 124 stows a retained length of cable 126. For example, the cable retention mechanism 124 may comprise a spool within which the retained length of cable 126 is stowed. The AMD 102 may include one or more sensors 128. The sensors 128 may be used to determine length data. The length data may be indicative of the retained length of cable 126, a deployed length of cable 130, and so forth. The deployed length of cable 130 may comprise the length of cable 122 that extends between the first section 108 and the second section 110. In one implementation, the sensors 128 may include a motor encoder on the actuator 116 used to move the flexible rack 120. The motor encoder may provide data indicative of a number of rotations and direction of rotation that may then be used to determine length data. In another example, the sensors 128 may include an optical sensor in the first section 108 that is proximate to the cable retention mechanism 124. The optical sensor may sense one or more of the flexible rack 120 or the cable 122 as it moves past to determine the length data. In yet another example, one or more of the flexible rack 120 or the cable 122 may include markings that are representative of particular lengths, and the sensor 128 may read these markings to determine the length data. Several implementations of the cable retention mechanism 124 and sensors 128 to determine length data are described with regard to FIG. 4.

The second section 110 may include sensors 128, output devices 132, and other electronic circuitry such as a transmitter (not shown in this figure) and a noise cancellation device 136. The sensors 128 may comprise a camera, microphone, accelerometers, and so forth. The output devices 132 may comprise a light, a speaker, and so forth. The sensors 128 and output devices 132 as discussed in more detail with regard to FIG. 6. The transmitter may generate an intended signal 134 at a transmitter output that is transferred to the first electrical conductor in the cable 122. The intended signal 134 as conveyed by the first electrical conductor may be used to send information from the sensors 128 in the second section 110 to a receiver in the first section 108. For example, the sensors 128 in the second section 110 may include a camera that generates image data. The transmitter may be used to generate the intended signal 134 to send that image data to the receiver in the first section 110.

During operation, a portion of the intended signal 134 as carried by the cable 122 may "leak" to produce radiated noise 138. For example, the first electrical conductor in the cable 122 may act as an unintentional radiator, emitting the radiated noise 138. The intended signal 134 and the radiated noise 138 produced by it have a first phase.

Changes in the overall distance between the first section 108 and the second section 110 produce changes in the retained length of cable 126 and the deployed length of cable 130. These changes affect the electrical characteristics of one or more of the electrical conductors in the cable 122. For example, the retained length of cable 126 may be coiled, increasing the inductance of the one or more electrical conductors in the cable 122. As the retained length of cable 126 increases, the inductance may decrease. Changes in the electrical characteristics of the cable 122 may affect the radiated noise 138, increasing or decreasing the amplitude, changing where along the cable 122 the radiated noise exhibits a greatest amplitude, and so forth.

The noise cancellation device 136 uses the intended signal 134 and the length data to generate an antinoise signal 140 having a second phase. The second phase may be opposite the first phase. For example, if the radiated noise 138 has a phase angle of 0 degrees, the antinoise signal 140 may have a phase angle of 180 degrees. The antinoise signal 140 is transferred to a second electrical conductor in the cable 122 that is used to radiate the antinoise signal 140. The amplitude of the antinoise signal 140 may be less than or equal to the amplitude of the radiated noise 138. The antinoise signal 140 destructively interferes with at least a portion of the radiated noise 138, reducing an effective overall amplitude of the radiated noise 138.

By using the noise cancellation device 136 the overall amplitude of the radiated noise 138 is reduced. This reduction in the overall amplitude of the radiated noise 138 may reduce or eliminate electromagnetic interference to other components in the AMD 102, other devices that are nearby, and so forth. The reduction may also improve compliance with regulatory standards associated with electromagnetic interference.

The noise cancellation device 136 may also facilitate more varied industrial designs, a reduction in overall weight, the use of less expensive cable 122, and so forth. For example, a heavily shielded cable 122 may have a physical size that makes it too large to fit within the mast 112. The noise cancellation device 136 may allow for the use of a smaller cable 122 that fits within the mast 112.

Figure 2:
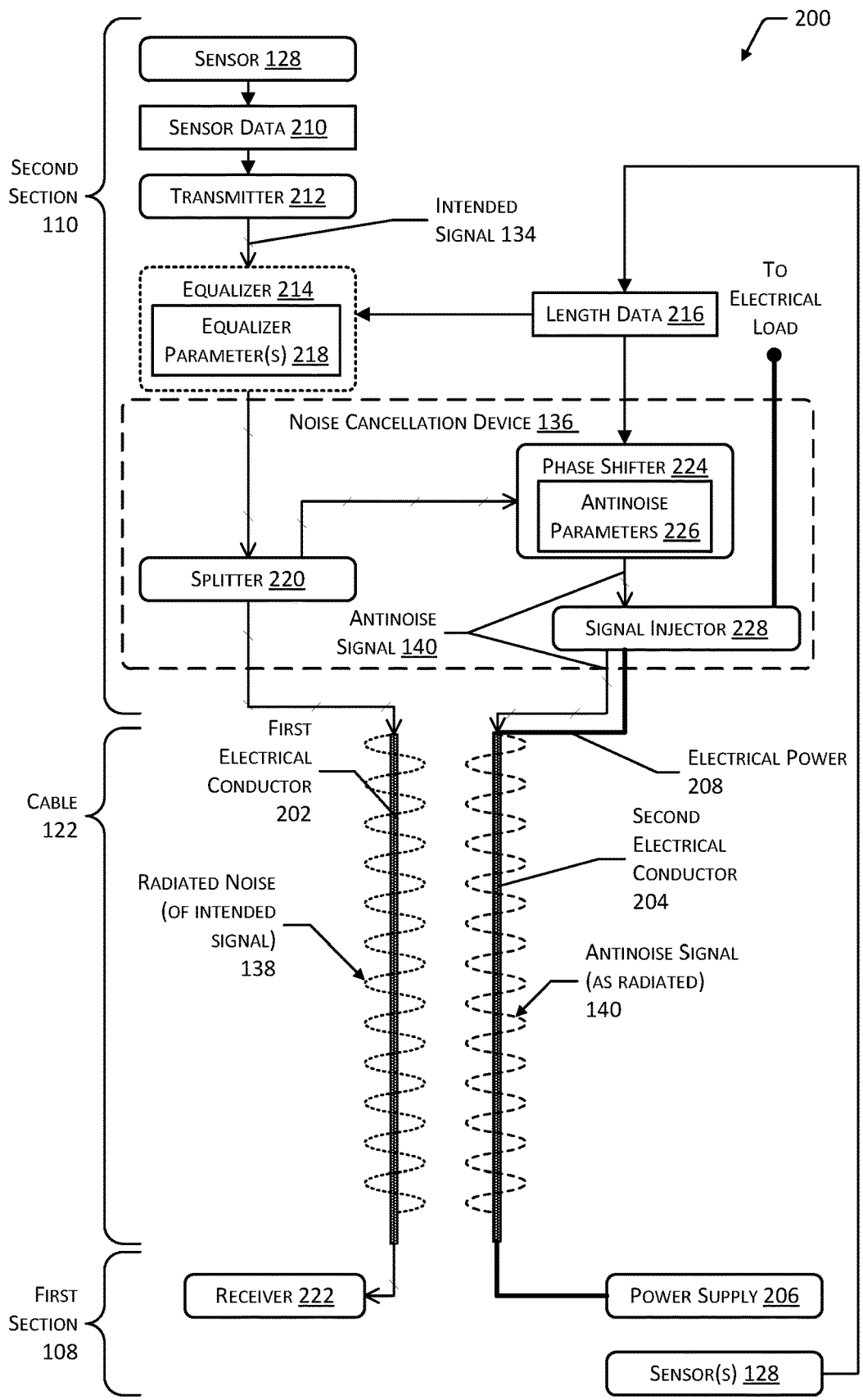
FIG. 2 is a block diagram of the noise cancellation device and the introduction of an antinoise signal to destructively interfere with radiated noise from the cable, according to some implementations.

FIG. 2 is a block diagram 200 of the noise cancellation device 136 and the introduction of the antinoise signal 140 to destructively interfere with the radiated noise 138 from the cable 122, according to some implementations.

In this illustration the second section 110 and the first section 108 are connected via the cable 122. The cable 122 includes at least a first electrical conductor 202 and a second electrical conductor 204.

The second electrical conductor 204 may be connected to a power supply 206 in the first section 108. The power supply 206 may provide electrical power 208 that is transferred via the second electrical conductor 204 to the second section 110.

The second section 110 may include one or more sensors 128 that generate sensor data 210. For example, a camera may generate image data. The sensor data 210 is provided as input to a transmitter 212. The transmitter 212 may comprise a broadband device that generates the intended signal 134 responsive to input. In some implementations, the intended signal 134 may comprise a plurality of carriers at different frequencies. These carriers may be modulated to transfer data.

In some implementations the second section 110 may include an equalizer 214. The equalizer 214 may comprise equalization circuitry that selectively amplifies or attenuates carriers within particular frequency bands. The equalizer 214 may apply selective amplification or attenuation to different frequency bands of the intended signal 134 provided at the transmitter output of the transmitter 212. In some implementations the transmitter 212 may perform equalization, selectively amplifying or attenuating carriers within particular frequency bands. The equalizer 214 may be used to improve performance of data transmission by reducing intersymbol interference at a receiver that may occur due to the frequency response of the communication channel. For example, the cable 122 may exhibit significant attenuation at frequencies greater than 1 GHz. The equalizer 214 may then amplify the carriers in the intended signal 134 that have a frequency greater than 1 GHz to offset the attenuation introduced by the cable 122.

Length data 216 may be generated based on information obtained by one or more sensors 128. The one or more sensors 128 may be in one or more of the first section 108, the second section 110, the mast 112, the cable 122, and so forth. For example, the sensor 128 may comprise an encoder on the actuator 116 or an optical sensor that measures movement of the cable 122 in and out of the cable retention mechanism 124. In another example, the cable 122 may include a sensor comprising one or more strain gauges. Output from a strain gauge may be used to determine that portion of the cable 122 is straight (such as when deployed) or curved (such as when stowed in the cable retention mechanism 124). Various sensors 128 used to determine length data 216 are discussed with regard to FIG. 4.

The length data 216 may be indicative of one or more of the retained length of cable 126, the deployed length of cable 130, a length of cable that is within the mast 112, and so forth. For example, the length data 216 may indicate that the deployed length of cable is 90 centimeters. In implementations where the overall length remains substantially the same, some values may be calculated. For example, given an overall length of 100 cm and a deployed length of cable 130 of 90 cm, the retained length of cable 126 may be 10 cm. The length data 216 may be represented as digital data or as an analog waveform.

In some implementations the length data 216 may be indicative of the extension of the mast 112. For example, the mast 112 may include an encoder mechanism that provides information indicative of how far the mast 112 is extended. This information may be used as the length data 216.

Returning to the equalizer 214, in some implementations one or more equalizer parameters 218 used by the equalizer 214 during operation may be determined based on the length data 216. For example, the value of amplification or attenuation for a particular frequency band may vary based on the deployed length of cable 130. Continuing the example, changes in the inductance of the cable due to different retained lengths of cable 126 may result in different levels of amplification for different retained lengths of cable 126. The length data 216 may be used to lookup or calculate the equalizer parameters 218 for use by the equalizer 214. An example of equalizer parameters 218 and how they may vary based on length data 216 are described in more detail with regard to FIG. 7.

The noise cancellation device 136 may include a signal splitter 220. The signal splitter 220 transfers the intended signal 134 to the first electrical conductor 202 and to a sample output port. A first power of the intended signal 134 delivered by the signal splitter 220 to the first electrical conductor 202 may be different from a second power of the intended signal 134 as delivered to the sample output port. For example, the second power may be less than the first power. The intended signal 134 is carried by the first electrical conductor 202 to a receiver 222 in the first section 108. As described above, a portion of the intended signal 134 that is transferred by the first electrical conductor 202 may be emitted as radiated noise 138.

The sample output port of the signal splitter 220 is connected to an input port of a phase shifter 224. As a result, the phase shifter 224 receives as input a portion of the intended signal 134. The phase shifter 224 may comprise a digital phase shifter or an analog phase shifter. The phase shifter 224 may also accept as input the length data 216. For example, the length data 216 may comprise a digital value that is provided to the phase shifter 224 as a digital input. In another example, the length data 216 may comprise an analog signal that is provided to the phase shifter 224 as an analog input. The length data 216 is used to determine one or more antinoise parameters 226. For example, based on the deployed length 130 a set of previously determined antinoise parameters 226 may be retrieved. The antinoise parameters 226 may include one or more of phase offset, amplitude, and so forth. The phase offset specifies difference between a phase of the intended signal 134 and a phase of an antinoise signal 140 provided by the phase shifter 224 at a phase shifter output. The amplitude may specify the amplitude of the antinoise signal 140 or portions thereof. For example, specific amplitude values may be specified for particular frequencies.

The antinoise signal 140 is transferred to an electrical conductor in the cable 122 other than the first electrical conductor 202. In the implementation depicted here, the antinoise signal 140 is transferred from the output of the phase shifter 224 to a signal input port of a signal injector 228. The signal injector 228 transfers the antinoise signal 140 from the signal input port to a first port that is connected to the second electrical conductor 204. As described above, the second electrical conductor 204 may be connected to the power supply 206 in the first section 108. The signal injector 228 may operate to pass direct DC current from the first port to a second port, while blocking the antinoise signal 140 from the second port. The second port may then be used to provide power to an electrical load in the second section 110.

In another implementation, an otherwise unused electrical conductor in the cable 122 may be used and the signal injector 228 may be omitted.

During operation, the antinoise signal 140 destructively interferes with at least a portion of the radiated noise 138. As a result, the overall amplitude of the radiated noise 138 is reduced.

In other implementations other circuitry not otherwise shown may be present. For example, the phase shifter 224 may be used to change the phase of the intended signal 134 signal that is transferred by the first electrical conductor 202. In another implementation a phase delay may be introduced to the intended signal 134 after the signal splitter 220. This phase delay may be used to increase the range of positive or negative phase offset that may be applied to the produce the antinoise signal 140.

Figure 3:
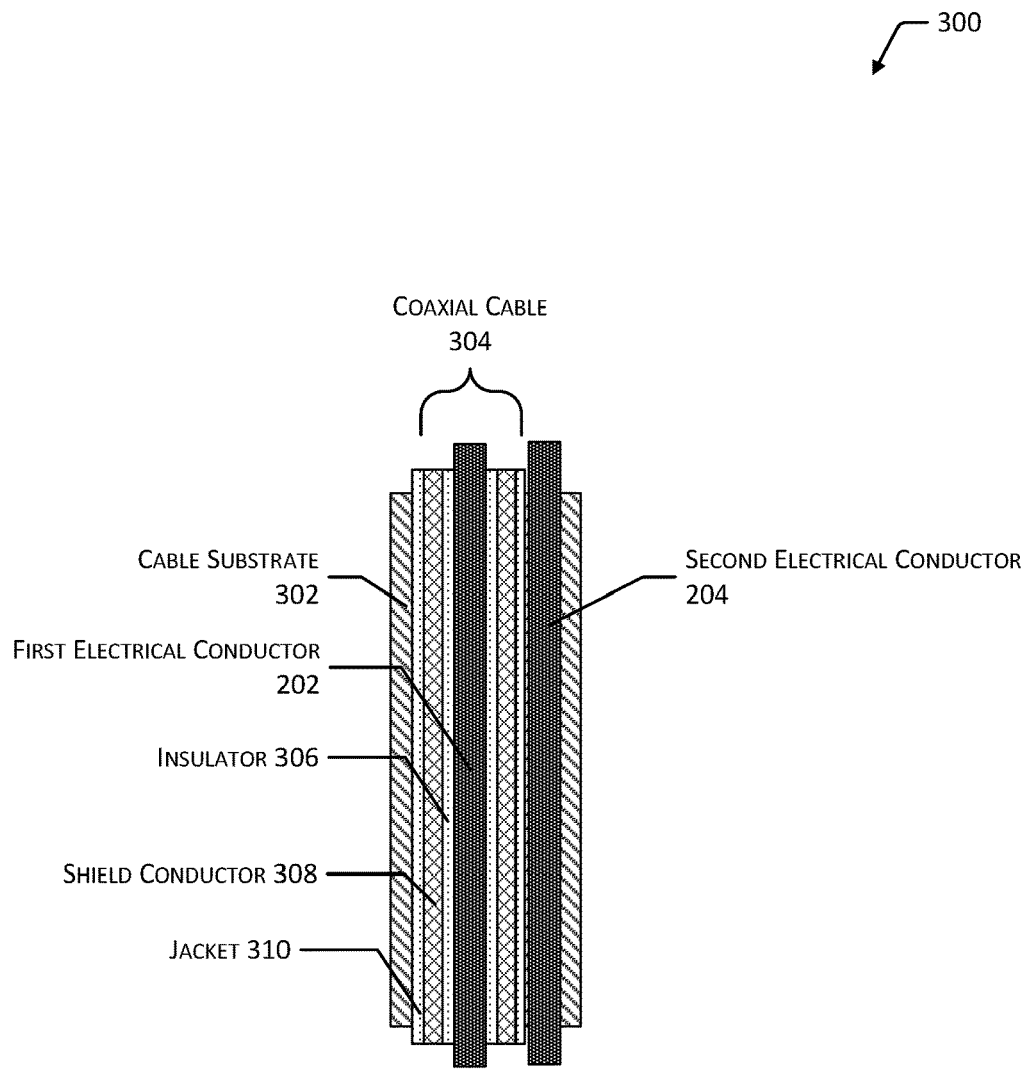
FIG. 3 illustrates a portion of the cable structure including a coaxial cable and an unshielded conductor, according to some implementations.

FIG. 3 illustrates a portion 300 of the cable 122 structure, according to some implementations. The cable 122 may comprise a cable substrate 302. For example, the cable substrate 302 may comprise a metal, plastic, fabric, composite, and so forth. The cable substrate 302 may maintain the spacing and orientation of electrical conductors and optical waveguides on the cable 122 relative to one another. In one implementation, the cable 122 may comprise a coaxial cable 304. The coaxial cable 304 may comprise the first electrical conductor 202 as a center conductor. The first electrical conductor 202 may be surrounded by an insulator 306. The insulator 306 may then be surrounded by a shield conductor 308. The shield conductor 308 may comprise a braid, foil, coating, or other structure. In some implementations a jacket 310 comprising an insulating material may surround the shield conductor 308. The shield conductor 308 may be unable to completely shield the first electrical conductor 202, resulting in signal leakage that produces the radiated noise 138. The coaxial cable 304 is joined to the cable substrate 302. For example, the coaxial cable 304 and the cable substrate 302 may be joined by adhesive, lamination, overmolding, mechanical engagement features, and so forth.

The cable 122 includes additional electrical conductors. For example, the cable 122 includes the second electrical conductor 204. The second electrical conductor 204 may be arranged parallel to the first electrical conductor 202. In some implementations the second electrical conductor 204 may be surrounded by an insulator, or the cable substrate 302 may comprise an insulator and may be used to provide insulation for the second electrical conductor 204. Additional electrical conductors may also be present in the cable 122. The second electrical conductor 204 or other electrical conductor used to carry the antinoise signal 140 is proximate to the first electrical conductor 202. For example, as depicted here the second electrical conductor 204 is immediately adjacent the jacket 310 of the coaxial cable 304. By placing the second electrical conductor 204 or other electrical conductor that is used to carry the antinoise signal 140 close to the first electrical conductor 202, the mutual coupling between the two conductors is improved, improving the effective reduction of radiated noise 138.

In another implementation the cable 122 may comprise a flexible printed circuit. For example, the first electrical conductor 202 and the second electrical conductor 204 may comprise metallic traces that are supported by a flexible substrate.

Each of the electrical conductors in the cable 122 exhibit a particular velocity factor (VF). The velocity factor is a ratio of the speed at which a wavefront of an electromagnetic signal passes along the conductor, relative to the speed of light in a vacuum. For example, a VF of 0.99 indicates the electromagnetic signal transferred by the conductor is travelling at 99% the speed of light in the vacuum. The VF for a particular conductor is based on a variety of different considerations. For example, the inductance and capacitance affect the velocity factor. Continuing the example, the inductance and capacitance can be affected by the presence of nearby objects such as insulators and other conductors, physical configuration of the conductor, and so forth. For example, a wire that is coiled will exhibit greater inductance than a wire that is straight.

As the retained length of cable 126 and the deployed length of the cable 130 change with extension and retraction of the mast 112, the VF of the first electrical conductor 202 and the VF of the second electrical conductor 204 may vary. This variance, if unaccounted for, may result in the radiated noise 138 and the antinoise signal 140 exhibiting a phase difference which would prevent destructive interference. By using the length data 216 to determine the antinoise parameters 226, the noise cancellation device 136 is able to address this variation.

In some situations, due to the differences in VF between the first electrical conductor 202 and the second electrical conductor 204, the effectiveness of destructive interference between the radiated noise 138 and the antinoise signal 140 may differ along the cable 122. For example, at a first location on the cable 122 the destructive interference may result in a −10 decibel (dB) reduction in radiated noise 138 while at a second location a −19 dB reduction may occur.

The antinoise parameters 226 may account for these differences and produce an antinoise signal 140 that maximizes destructive interference at a particular portion of the cable 122.

In some implementations the noise cancellation device 136 or a portion thereof may be installed on the cable 122. For example, a particular portion of the cable 122 may be determined to produce radiated noise 138 that is above a threshold value. The noise cancellation device 136 may be installed at or near that portion of the cable 122 such that the antinoise signal 140 is injected into that portion of the cable.

In some implementations a plurality of noise cancellation devices 136 may be used. For example, a first noise cancellation device 136 may be installed in the second section 110 and a second noise cancellation device 136 may be installed along the cable 122.

The cable 122 may be separate from or may incorporate elements of the flexible rack 120. For example, the cable 122 may comprise a relatively stiff but flexible material and may include mechanical engagement features such as teeth that may be engaged by a gear attached to the actuator 116.

In some implementations the cable 122 may comprise rigid sections. For example, the cable 122 may comprise a belt with multiple links.

Figure 4:
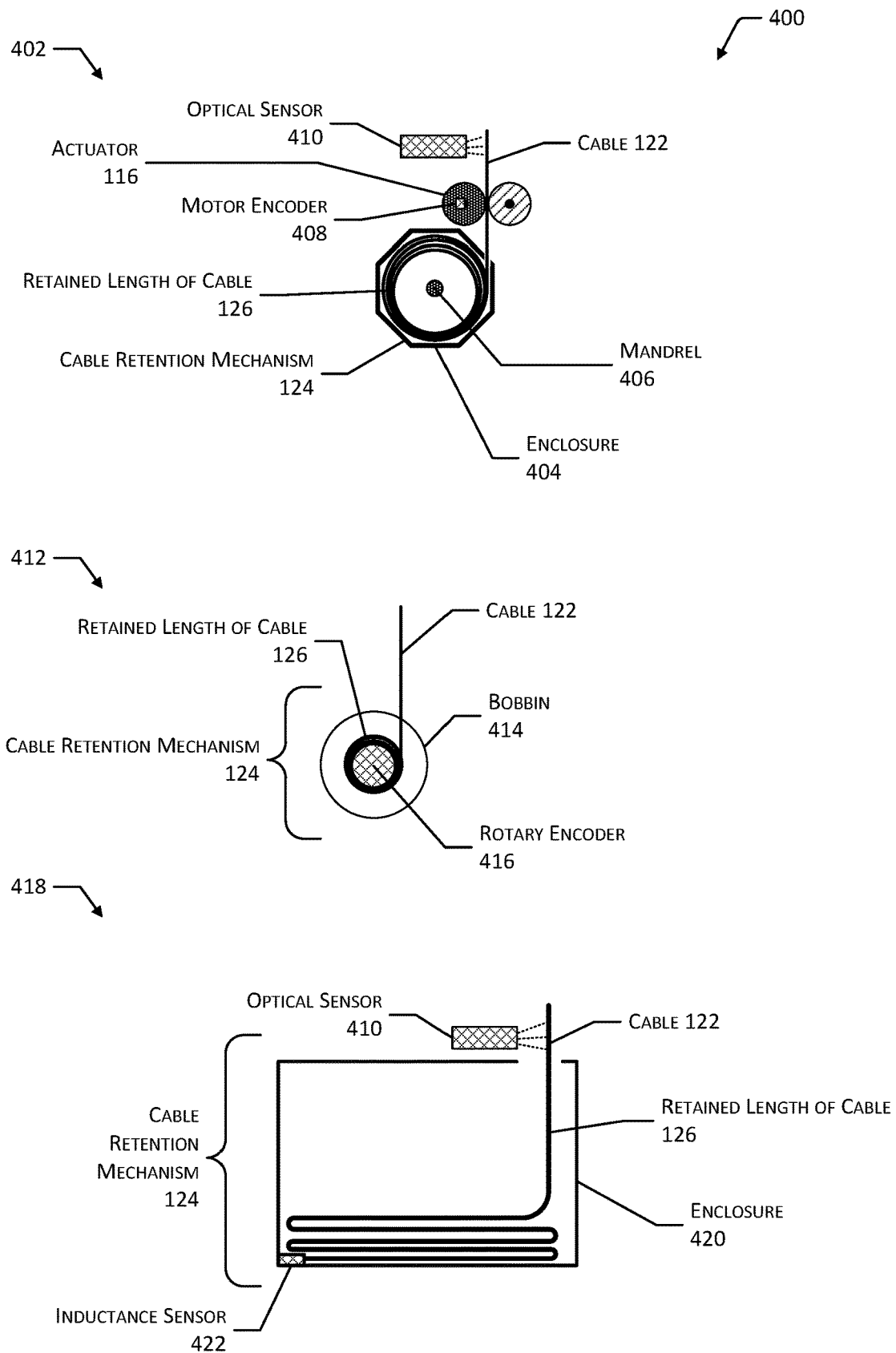
FIG. 4 illustrates several cable retention mechanisms and sensor arrangements, according to some implementations.

FIG. 4 illustrates several cable retention mechanisms 400 and sensor arrangements that may be used to generate the length data 216, according to some implementations.

A first implementation 402 depicts a cable retention mechanism 124 that comprises an enclosure 404. A mandrel 406 may be arranged within the enclosure 404. The mandrel 406 may prevent fouling of the cable 122 during stowage and deployment. In one implementation the enclosure 404 may comprise a spool. A first end of the cable 122 may be affixed to the enclosure 404 in the first section 108 of the AMD 102 while a second end of the cable 122 is routed to the second section 110.

One or more sensors 128 may be used to determine the length data 216. These sensors 128 may include optical sensors, rotary encoders, linear encoders, circuitry to detect inductance, and so forth.

A motor encoder 408 may be used to generate data indicative of the movement by the actuator 116 during deployment of the cable 122. For example, the motor encoder 408 may provide information such as the direction of rotation and number of rotations. Based on the output from the motor encoder 408, the length data 216 may be determined. For example, 25 rotations in the +1 direction from a known starting configuration indicates that the deployed length of cable 130 is 75 cm.

Also shown is an optical sensor 410. The optical sensor 410 may use an optical transmitter (such as a light emitting diode) and an optical sensor (such as a photodetector or imaging sensor) to determine relative movement of the cable 122. Based on output from the optical sensor 410, the length data 216 may be determined. For example, the optical sensor 410 may indicate that 37 cm of cable 122 has moved in the +1 direction, indicating deployment.

In another implementation, the optical sensor 410 may be used to detect markings on the cable 122. For example, the cable 122 may include markings that indicate a particular position along the cable 122. The output from the optical sensor 410 may indicate a particular position at a particular time, such as "t=0, 17 cm; t=1, 19 cm". The output may be used to determine the length data 216 either directly from the reported position, or by comparison given a known starting configuration.

A second implementation 412 depicts a cable retention mechanism 124 that comprises a bobbin 414. The cable 122 may be wound and unwound from the bobbin 414 during retention or deployment, respectively. A rotary encoder 416 may be used to determine rotation of the bobbin 414. For example, the rotary encoder 416 may comprise a mechanical, magnetic, conductive, or optical rotary encoder. The output from the rotary encoder 416 may indicate relative angle or absolute position. Output from the rotary encoder 416 may be used to determine the length data 216.

A third implementation 418 depicts a cable retention mechanism 124 that comprises an enclosure 420. In this implementation, the cable 122 may be stowed within the enclosure 420 in a serpentine fashion, with consecutive courses of the cable 122 arranged above one another. An optical sensor 410 may be used to determine the movement of cable 122 into and out of the enclosure 420. Output from the optical sensor 410 may then be used to determine the length data 216.

An inductance sensor 422 may be used to determine the length data 216. For example, an inductance sensor 422 in the first section 108 may be connected to a first end of the cable 122. The inductance sensor 422 may comprise electronic circuitry to determine the inductance of one or more conductors in the cable 122. Based on the inductance, the length data 216 may be determined. In some implementations, the length data 216 may represent the inductance. For example, an inductance value may be used in place of a linear distance measurement to operate the phase shifter 224.

In other implementations, other cable retention mechanisms 124 may be used. Other sensors 128 may also be used to determine the length data 216. For example, capacitive, inductive, magnetic, or other sensors may be used to determine relative movement of the cable 122, detect tags or features on the cable 122, and so forth. In another example, one or more strain gauges may be affixed to or incorporated into the cable 122. A strain value less than a first threshold may indicate that the portion of the cable 122 with that strain gauge affixed is straight and thus deployed, while a strain value greater than a second threshold may indicate that the cable 122 is bent and thus stowed.

Figure 5:
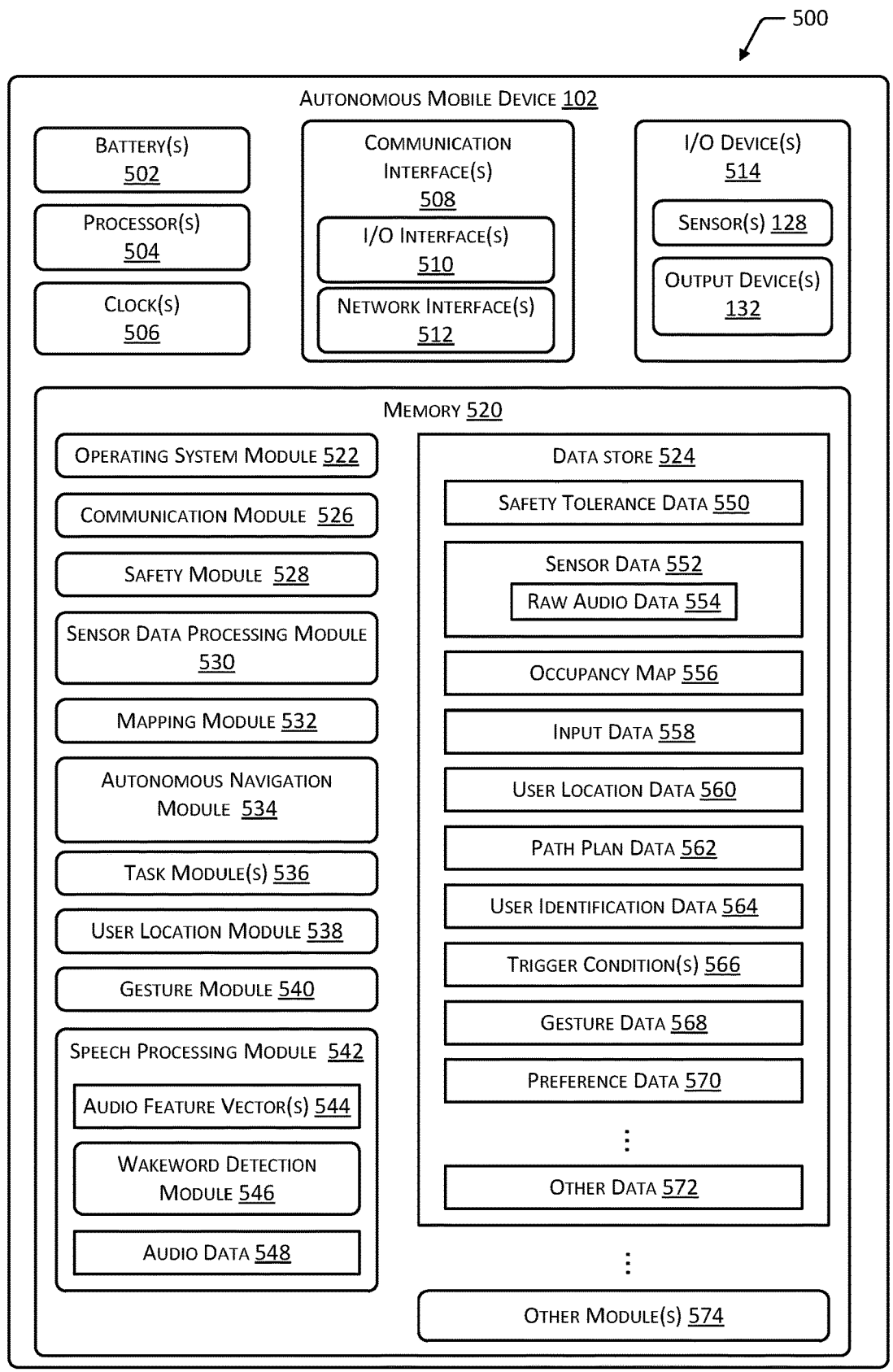
FIG. 5 is a block diagram of the components of the autonomous mobile device, according to some implementations.

FIG. 5 is a block diagram 500 of the components of the AMD 102, according to some implementations. The AMD 102 may include one or more batteries 502 to provide electrical power suitable for operating the components in the AMD 102. In some implementations other devices may be used to provide electrical power to the AMD 102. For example, power may be provided by wireless power transfer, capacitors, fuel cells, storage flywheels, and so forth.

The AMD 102 may include one or more hardware processors 504 (processors) that execute one or more stored instructions. The processors 504 may comprise one or more cores. The processors 504 may include microcontrollers, systems on a chip, field programmable gate arrays, digital signal processors, graphic processing units, general processing units, and so forth. One or more clocks 506 may provide information indicative of date, time, ticks, and so forth. For example, the processor 504 may use data from the clock 506 to associate a particular interaction with a particular point in time.

The AMD 102 may include one or more communication interfaces 508 such as input/output (I/O) interfaces 510, network interfaces 512, and so forth. The communication interfaces 508 enable the AMD 102, or components thereof, to communicate with other devices or components. The communication interfaces 508 may include one or more I/O interfaces 510. The I/O interfaces 510 may comprise Inter-Integrated Circuit (I2C), Serial Peripheral Interface (SPI), Universal Serial Bus (USB) as promulgated by the USB Implementers Forum, RS-232, and so forth.

The I/O interface(s) 510 may couple to one or more I/O devices 514. The I/O devices 514 may include input devices such as one or more of a sensor 128, keyboard, mouse, scanner, and so forth. The I/O devices 514 may also include output devices 132 such as one or more of a motor, light, speaker, display, projector, printer, and so forth. In some embodiments, the I/O devices 514 may be physically incorporated with the AMD 102 or may be externally placed.

The network interfaces 512 may provide communications between the AMD 102 and other devices such as other AMDs 102, a docking station, routers, access points, and so forth. The network interfaces 512 may include devices to couple to personal area networks (PANs), local area networks (LANs), wireless local area networks (WLANS), wide area networks (WANs), and so forth. For example, the network interfaces 512 may include devices compatible with Ethernet, Wi-Fi, Bluetooth, Bluetooth Low Energy, ZigBee, and so forth.

The AMD 102 may use the network interfaces 512 to connect to a network. For example, the network may comprise a wireless local area network, that in turn is connected to a wide area network such as the Internet.

The AMD 102 may also include one or more busses or other internal communications hardware or software that allow for the transfer of data between the various modules and components of the AMD 102.

As shown in FIG. 5, the AMD 102 includes one or more memories 520. The memory 520 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 520 provides storage of computer-readable instructions, data structures, program modules, and other data for the operation of the AMD 102. A few example functional modules are shown stored in the memory 520, although the same functionality may alternatively be implemented in hardware, firmware, or as a system on a chip (SoC).

The memory 520 may include at least one operating system (OS) module 522. The OS module 522 manages hardware resource devices such as the I/O interfaces 510, the I/O devices 514, the communication interfaces 508, and provide various services to applications or modules executing on the processors 504. The OS module 522 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 520 may be a data store 524 and one or more of the following modules. These modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including other AMDs 102, servers, network attached storage devices, and so forth.

A communication module 526 may establish communication with other AMDs 102, an external server, a docking station, and so forth. The communications may be authenticated, encrypted, and so forth.

Other modules within the memory 520 may include a safety module 528, a sensor data processing module 530, a mapping module 532, an autonomous navigation module 534, the one or more task modules 536, the user location module 538, a gesture module 540, a speech processing module 542, or other modules 574. The modules may access data stored within the data store 524, such as safety tolerance data 550, sensor data 552, or other data 572.

The safety module 528 may access safety tolerance data 550 to determine within what tolerances the AMD 102 may operate safely within the physical environment. For example, the safety module 528 may stop the AMD 102 from moving when the extensible mast 112 is extended. In another example, the safety tolerance data 550 may specify a minimum sound threshold which, when exceeded, stops all movement of the AMD 102. Continuing this example, detection of sound such as a human yell would stop the AMD 102. In another example, the safety module 528 may access safety tolerance data 550 that specifies a minimum distance from an object that the AMD 102 may maintain. Continuing this example, when a sensor 128 detects an object has approached to less than the minimum distance, all movement of the AMD 102 may be stopped. Movement of the AMD 102 may be stopped by one or more of inhibiting operations of one or more of the motors, issuing a command to stop motor operation, disconnecting power from one or more of the motors, and so forth. The safety module 528 may be implemented as hardware, software, or a combination thereof.

The safety module 528 may control other factors, such as a maximum speed of the AMD 102 based on information obtained by the sensors 128, precision and accuracy of the sensor data 552, and so forth. For example, detection of an object by an optical sensor may include some error, such as when the distance to an object comprises a weighted average between an object and a background. As a result, the maximum speed permitted by the safety module 528 may be based on one or more factors such as the weight of the AMD 102, nature of the floor, distance to the object, and so forth. In the event that the maximum permissible speed differs from the maximum speed permitted by the safety module 528, the lesser speed may be utilized.

The sensor data processing module 530 may access sensor data 552 that is acquired from one or more the sensors 128. The sensor data processing module 530 may provide various processing functions such as de-noising, filtering, change detection, and so forth. Processing of sensor data 552, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 552. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 552 or other data 572. For example, the ANN may be a trained using a supervised learning algorithm such that object identifiers are associated with images of particular objects within training images provided to the ANN. Once trained, the ANN may be provided with the sensor data 552 and produce output indicative of the object identifier.

The autonomous navigation module 534 provides the AMD 102 with the ability to navigate within the physical environment without real-time human interaction. The autonomous navigation module 534 may implement, or operate in conjunction with, the mapping module 532 to determine the occupancy map 556 or other representation of the physical environment. In one implementation, the mapping module 532 may use one or more simultaneous localization and mapping ("SLAM") techniques. The SLAM algorithms may utilize one or more of maps, algorithms, beacons, or other techniques to provide navigational data. The navigational data may then be used to determine the path plan data 562 which is then subsequently used to determine a set of commands that drive the motors connected to the wheels. For example, the autonomous navigation module 534 may determine a location within the environment, estimate a path to a destination, and so forth.

A path planning module may be part of, or operate in conjunction with, the autonomous navigation module 534. During operation, the autonomous navigation module 534 may use the occupancy map 556, the user location data 560, the gesture data 568, preference data 570, and so forth to determine path plan data 562. For example, the autonomous navigation module 534 may determine a current location of the AMD 102 and determine an overall course that the AMD 102 is to follow to perform a task, while the path planning module handles a portion of that course that is proximate to the AMD 102. Continuing the example, the path planning module may be used to determine a course from the AMD's 102 current location to a first waypoint elsewhere in the room that was determined by the autonomous navigation module 534.

The path planning module may determine path plan data 562 at specified intervals, upon receipt of data indicative of a change, and so forth. For example, the path planning module may determine path plan data 562 at a specified interval, such as every 200 ms, or every meter. Appearance of an obstacle may result in determination of path plan data 562 outside of the specified interval. A user trajectory module may also determine predicted trajectory data at specified intervals, upon a change in location of the user, and so forth.

In some implementations the path planning module may generate a plurality of possible paths to a waypoint, and then score or rank those paths. A highest scoring path, deemed to be most suitable, may then be selected and used as the path plan data 562. For example, the ranking may be based on the sum of the combined values of the obstacle cost values, and so forth for the areas or cells that are traversed by the possible path. In other implementations the ranking may be based on time to arrive.

The path plan data 562 may be subsequently used to direct the movement of the AMD 102. For example, the path plan data 562 may comprise a series of control instructions that are processed by a motor controller. These control instructions may comprise data indicative of a rotation rate of one or more motors, a duration of rotation, a total number of rotations of the one or more motors, and so forth. For example, the control instructions may instruct the motor controller to operate a first motor on a left side of the AMD 102 at a rate of 10.0 radians per second (rad/s) for 5 seconds and a second motor on a right side of the AMD 102 at a rate of 9.7 rad/s for 5 seconds.

The autonomous navigation module 534 may include an obstacle avoidance module. For example, if an obstacle is detected along a planned path, the obstacle avoidance module may re-route the AMD 102 to move around the obstacle or take an alternate path.

The occupancy map 556 may be manually or automatically determined. Continuing the example, during a learning phase the user may take the AMD 102 on a tour of the environment, allowing the AMD 102 to generate the occupancy map 556 and associated data, such as tags indicating designating a particular room, such as "kitchen" or "bedroom". In another example, during subsequent operation the AMD 102 may generate the occupancy map 556 that is indicative of locations of obstacles such as chairs, doors, stairwells, and so forth as it moves unattended through the environment.

In some implementations, the occupancy map 556 may include floor characterization data. The floor characterization data is indicative of one or more attributes of the floor at a particular location within the physical environment. During operation of the AMD 102, floor characterization data may be obtained. The floor characterization data may be utilized by one or more of safety module 528, the autonomous navigation module 534, the task module 536, or other modules 574. For example, the floor characterization data may be used to determine if an unsafe condition occurs such as a wet floor. In another example, the floor characterization data may be used by the autonomous navigation module 534 to assist in the determination of the current location of the AMD 102 within the home. For example, if the autonomous navigation module 534 determines that the AMD 102 is located in the dining room, but the floor characterization data indicates that the floors consistent with the living room, an error condition may be generated in which other techniques are used to determine the location of the AMD 102 or otherwise resolve the difference. For example, the AMD 102 may attempt to return to the docking station and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user. For example, the AMD 102 may use speech synthesis to ask the user "what room is this?" during a training phase. The utterance of the user may be received by the microphone array and the audio data "this is the living room" may be processed and subsequently used to generate the location designator.

The autonomous navigation module 534 may be used to move the AMD 102 from a first location to a second location within the physical environment. This movement may be responsive to a determination made by an onboard processor 504, in response to a command received via one or more communication interfaces 508 or a sensor 128, and so forth. For example, an external server may send a command that is subsequently received using a network interface 512. This command may direct the AMD 102 to proceed to a designated destination, such as "living room" or "dining room". The AMD 102 may then process this command, and use the autonomous navigation module 534 to determine the directions and distances associated with reaching the specified destination.

The memory 520 may store one or more task modules 536. The task modules 536 may comprise instructions that, when executed by the processor 504 perform a task. A task may include raising or lowering the mast 112. For example, a video call module may be used to have the AMD 102 find a particular user and present a video call using the output devices 132, extending the mast 112, and using a camera in the second section 110 to obtain image data for the video call. In another example, a sentry task module 536 may be used to have the AMD 102 travel throughout the environment while raising and lowering the mast 112 as necessary to observe different parts of the environment with the sensors 128 in the second section 110. The task module 536 comprises instructions that, when executed, provide one or more functions associated with a particular task. A task may have triggers to produce corresponding gestures by the AMD 102.

Tasks may involve a single behavior. In one example, the task may comprise a security or sentry task in which the AMD 102 travels throughout the physical environment avoiding users and looking for events that exceed predetermined thresholds. In the sentry task, the trigger may be detection of a user within a threshold distance while the gesture comprises performing a "nodding" motion by raising and lowering the mast 112. In another example, the task may comprise a "follow me" feature in which the AMD 102 follows a user using a follow behavior. For example, the user may participate in a video call using the AMD 102. The camera on the mast 112 may be used to acquire video for transmission while the display is used to present video that is received. The AMD 102 may use data from one or more sensors 128 to determine a location of the user relative to the AMD 102, and track and follow the user. In one implementation, computer vision techniques may be used to locate the user within image data acquired by the cameras. In another implementation, the user's voice may be detected by an array of microphones, and a direction to the voice with respect to the AMD 102 may be established. Other techniques may be utilized either alone or in combination to allow the AMD 102 to track a user, follow a user, or track and follow a user. The path of the AMD 102 as it follows the user may be based at least in part on one or more of constraint cost values. For example, while the AMD 102 is following the user down the hallway, the AMD 102 may stay to the right side of the hallway. In some situations, while following a user the AMD 102 may disregard some rules or may disregard the speed values for a particular area. For example, while following the user the AMD 102 may not slow down while passing a doorway.

In yet another example, the task may allow for the AMD 102 to be summoned to a particular location. The user may utter a voice command that is heard by a microphone on the AMD 102, a microphone in a smart phone, or another device with a microphone such as a network enabled speaker or television. While performing this task, the AMD 102 may utilize an avoid behavior until it reaches the particular location.

Alternatively, the user may issue a command using an app on a smartphone, wearable device, tablet, or other computing device. Given that the location of the device at which the command was obtained is known, the AMD 102 may be dispatched to that location. If the location is unknown, the AMD 102 may search for the particular user, utilizing an avoid behavior with respect to other users and an approach behavior for the particular user.

The user location module 538 may provide user location data 560 indicative of a location of a user. The user location module 538 may use the sensor data 552 from sensors 128 on the AMD 102 or other sensors in the environment. The user location module 538 processes the data to determine user location data 560 indicative of a user location in the environment. The user location data 560 may be indicative of coordinates within the environment that are indicative of a point associated with the user. For example, the user location data 560 may indicate a centroid of the area occupied by the user with respect to a fixed coordinate system used to represent locations within the environment.

In some implementations the user location module 538 may also process the data to determine user orientation data indicative of a user orientation in the environment. The user orientation data is indicative of a direction with respect to a fixed reference. For example, the user orientation data may be indicative of a heading as measured with respect to magnetic north, or an angle with respect to an axis of the fixed coordinate system. In some implementations the user orientation data may be indicative of an angle that extends from a reference point with respect to the user along a direction that is specified with respect to one or more features of the user. For example, the user orientation data may be based on a position of one or more of the user's head, shoulders, skeleton, feet, eyes, and so forth. In another example, the user orientation data may be based at least in part on a gaze direction of the user, that is indicative of which direction the user is looking. In one implementation the user orientation data may indicate the line that is perpendicular from a line extending through the shoulders of the user and extending away from the user in a ventral direction. For example, if the user is standing and facing East, the user orientation data may indicate 90 degrees. In another implementation, the user orientation data may indicate the line that is perpendicular to a line extending through both eyes of the user and starts at a midpoint between the eyes.

In some implementations the user location module 538 or other modules may provide user identification data 564. The user identification data 564 provides information that is indicative of a particular user. The user identification data 564 may be indicative of a login name, account name, serial number, and so forth. For example, the user identification data 564 may indicate that a user has been identified as "Pat" or "User994481". Determination of the user identification data 564 may be based on one or more of facial recognition, voice recognition, user input, biometric data, and so forth. For example, the user location module 538 may utilize a facial recognition module that determines one or more features of a face that is present in an image acquired by a camera, and compares that information to previously stored enrollment data. If the features match within a threshold value, the user identification data 564 may be determined. In another implementation the sound of the user's voice may be used to identify them.

During operation the AMD 102 may determine input data 558. The input data 558 may be based at least in part on sensor data 552 provided by the sensors 128 onboard the AMD 102. For example, the sensor data 552 may comprise audio data indicative of an utterance by the user. The audio data may be processed to determine that the utterance is representative of a verbal command provided by the user. The input data 558 may comprise information indicative of the command, parameters associated with it, and so forth. For example, the input data 558 may indicate a command of a request for weather information while the parameter indicates the location about which the weather information is requested.

The gesture module 540 determines the satisfaction of one or more trigger conditions 566. When a trigger condition 566 has been determined to be satisfied, the gesture data 568 may be used to generate specific instructions that, when executed, cause the AMD 102 to perform the gesture. The gesture module 540 may use as input the sensor data 552, input data 558, data associated with operation of the AMD 102, and so forth. For example, the gesture module 540 may receive user location data 560 that is based on sensor data 552 indicating the user is within a threshold distance, satisfying a trigger condition 566. The corresponding gesture data 568 may be retrieved, and the instructions executed to raise and lower the mast 112. In another example, the gesture module 540 may determine that no task is in progress and interaction with the user is concluded, satisfying a trigger condition 566. The corresponding gesture data 568 may be retrieved, directing the AMD 102 to retract the mast 112 and then after some interval of time, moves away.

The speech processing module 542 may be used to process utterances of the user. Microphones may acquire audio in the presence of the AMD 102 and may send raw audio data 554 to an acoustic front end (AFE). The AFE may transform the raw audio data 554 (for example, a single-channel, 16-bit audio stream sampled at 16 kHz), captured by the microphone, into audio feature vectors 544 that may ultimately be used for processing by various components, such as a wakeword detection module 546, speech recognition engine, or other components. The AFE may reduce noise in the raw audio data 554. The AFE may also perform acoustic echo cancellation (AEC) or other operations to account for output audio data that may be sent to a speaker of the AMD 102 for output. For example, the AMD 102 may be playing music or other audio that is being received from a network in the form of output audio data. To avoid the output audio interfering with the device's ability to detect and process input audio, the AFE or other component may perform echo cancellation to remove the output audio data from the input raw audio data 554, or other operations.

The AFE may divide the audio data into frames representing time intervals for which the AFE determines a number of values (i.e., features) representing qualities of the raw audio data 554, along with a set of those values (i.e., a feature vector or audio feature vector) representing features/qualities of the raw audio data 554 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 554, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 544 (or the raw audio data 554) may be input into a wakeword detection module 546 that detects keywords spoken in the audio. The wakeword detection module 546 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other embodiments, the AMD 102 may implement a limited classifier to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in the audio data.

Once speech is detected in the audio received by the AMD 102 (or separately from speech detection), the AMD 102 may use the wakeword detection module 546 to perform wakeword detection to determine when a user intends to speak a command to the AMD 102. This process may also be referred to as keyword detection, with the wakeword being a specific example of a keyword. Specifically, keyword detection is typically performed without performing linguistic analysis, textual analysis, or semantic analysis. Instead, incoming audio (or audio data 548) is analyzed to determine if specific characteristics of the audio match preconfigured acoustic waveforms, audio signatures, or other data to determine if the incoming audio "matches" stored audio data corresponding to a keyword.

Thus, the wakeword detection module 546 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 102 may "wake" and begin transmitting audio data 548 (which may include one or more audio feature vectors 544 or the raw audio data 554) to one or more server(s) for speech processing. The audio data 548 corresponding to audio obtained by the microphone may be sent to a server for routing to a recipient device or may be sent to the server for speech processing for interpretation of the included speech (either for purposes of enabling voice-communications and/or for purposes of executing a command in the speech). The audio data 548 may include data corresponding to the wakeword, or the portion of the audio data 548 corresponding to the wakeword may be removed by the local AMD 102 prior to sending.

The AMD 102 may connect to the network using one or more of the network interfaces 512. One or more servers may provide various functions, such as ASR, natural language understanding (NLU), providing content such as audio or video to the AMD 102, and so forth.

The other modules 574 may provide other functionality, such as object recognition, speech synthesis, user identification, and so forth. For example, an automated speech recognition (ASR) module may accept as input raw audio data 554 or audio feature vectors 544 and may produce as output a text string that is further processed and used to provide input, a task module 536, and so forth. In one implementation, the text string may be sent via a network to a server for further processing. The AMD 102 may receive a response from the server and present output, perform an action, and so forth. For example, the raw audio data 554 may include the user saying "robot go to the dining room". The audio data 548 representative of this utterance may be sent to the server that returns commands directing the AMD 102 to the dining room of the home associated with the AMD 102.

The utterance may result in a response from the server that directs operation of other devices or services. For example, the user may say "robot wake me at seven tomorrow morning". The audio data 548 may be sent to the server that determines the intent and generates commands to instruct a device attached to the network to play an alarm at 7:00 am the next day.

The other modules 574 may comprise a speech synthesis module that is able to convert text data to human speech. For example, the speech synthesis module may be used by the AMD 102 to provide speech that a user is able to understand.

During operation the AMD 102 may access preference data 570. The preference data 570 may indicate preferences associated with a particular geographic region, physical address, user, and so forth. For example, a particular user may prefer a very slight change in the movement of the display while performing a nodding behavior, while another user may prefer a larger range of motion to improve visibility of the gesture. In other implementations, other preferences may be specified.

The data store 524 may store other data 572 such as localization settings, user identifier data, and so forth.

The AMD 102 may dock or connect to a docking station. The docking station may also be connected to the network. For example, the docking station may connect to the wireless local area network such that the docking station and the AMD 102 may communicate. The docking station may provide external power which the AMD 102 may use to charge the battery 502.

The AMD 102 may access one or more servers via the network. For example, the AMD 102 may utilize a wakeword detection module 546 to determine if the user is addressing a request to the AMD 102. The wakeword detection module 546 may hear a specified word or phrase, transition the AMD 102 or a portion thereof to the wake operating mode. Once in the wake mode, the AMD 102 may then transfer at least a portion of the audio spoken by the user to one or more servers for further processing. The servers may process the spoken audio and return to the AMD 102 data that may be subsequently used to operate the AMD 102.

The AMD 102 may also communicate with other devices. The other devices may include home automation controls, sensors, and so forth that are within the home or associated with operation of one or more devices in the home. For example, the other devices may include a doorbell camera, a garage door, a refrigerator, a washing machine, a network connected microphone, and so forth.

In other implementations, other types of AMD may use the systems and techniques described herein. For example, the AMD 102 may comprise an autonomous ground vehicle that is moving on a street, an autonomous aerial vehicle in the air, autonomous marine vehicle, and so forth.

Figure 6:
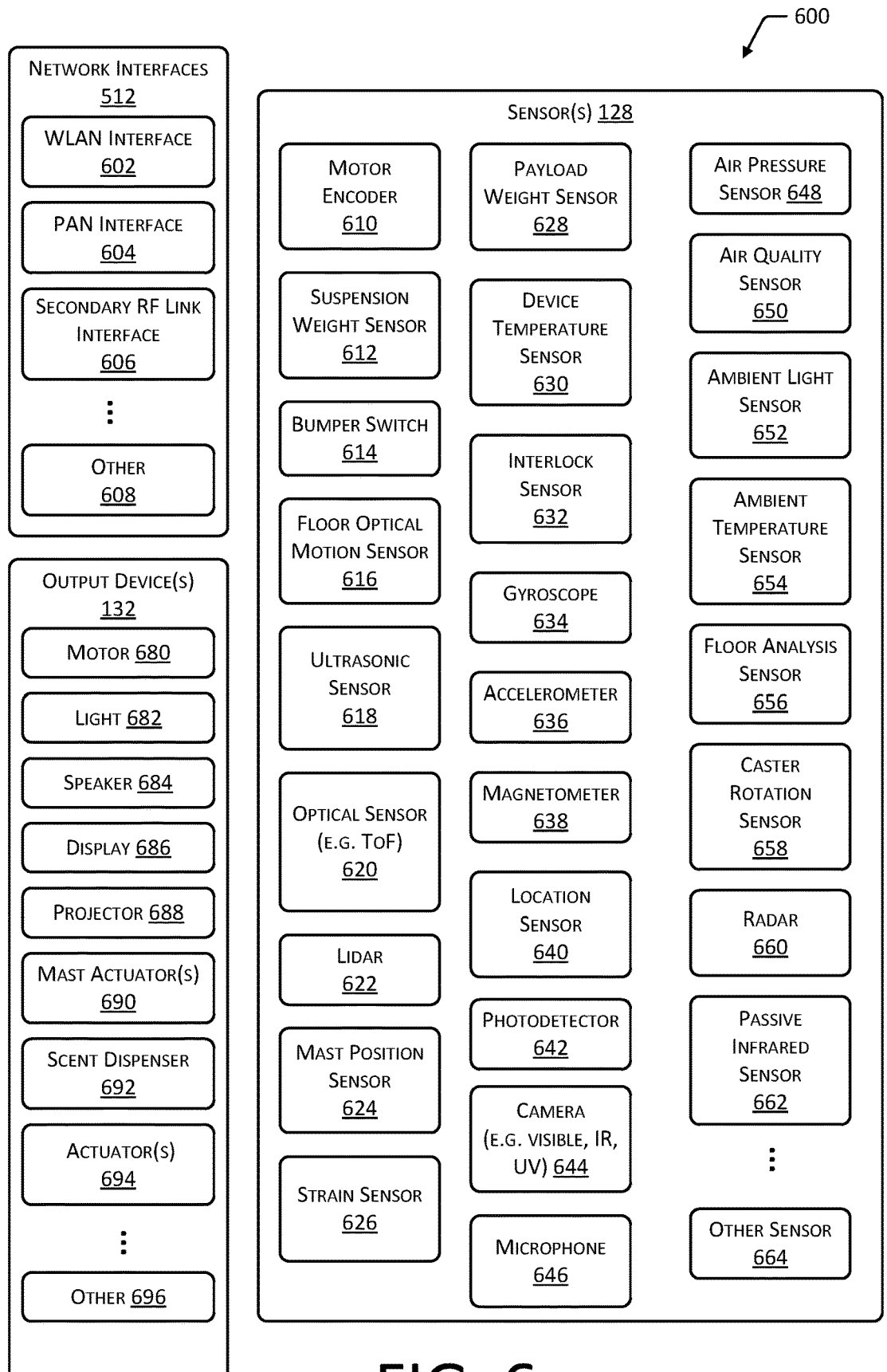
FIG. 6 is a block diagram of some components of the autonomous mobile device such as network interfaces, sensors, and output devices, according to some implementations.

FIG. 6 is a block diagram 600 of some components of the AMD 102 such as network interfaces 512, sensors 128, and output devices 132, according to some implementations. The components illustrated here are provided by way of illustration and not necessarily as a limitation. For example, the AMD 102 may utilize a subset of the particular network interfaces 512, output devices 132, or sensors 128 depicted here, or may utilize components not pictured. One or more of the sensors 128, output devices 132, or a combination thereof may be included in the second section 110 that may be displaced relative to the first section 108.

The network interfaces 512 may include one or more of a WLAN interface 602, PAN interface 604, secondary radio frequency (RF) link interface 606, or other interface 608. The WLAN interface 602 may be compliant with at least a portion of the Wi-Fi specification. For example, the WLAN interface 602 may be compliant with at least a portion of the IEEE 802.11 specification as promulgated by the Institute of Electrical and Electronics Engineers (IEEE). The PAN interface 604 may be compliant with at least a portion of one or more of the Bluetooth, wireless USB, Z-Wave, ZigBee, or other standards. For example, the PAN interface 604 may be compliant with the Bluetooth Low Energy (BLE) specification.

The secondary RF link interface 606 may comprise a radio transmitter and receiver that operate at frequencies different from or using modulation different from the other interfaces. For example, the WLAN interface 602 may utilize frequencies in the 2.4 GHz and 5 GHz Industrial Scientific and Medicine (ISM) bands, while the PAN interface 604 may utilize the 2.4 GHz ISM bands. The secondary RF link interface 606 may comprise a radio transmitter that operates in the 900 MHz ISM band, within a licensed band at another frequency, and so forth. The secondary RF link interface 606 may be utilized to provide backup communication between the AMD 102 and other devices in the event that communication fails using one or more of the WLAN interface 602 or the PAN interface 604. For example, in the event the AMD 102 travels to an area within the physical environment that does not have Wi-Fi coverage, the AMD 102 may use the secondary RF link interface 606 to communicate with another device such as a specialized access point, docking station, or other AMD 102.

The other 608 network interfaces may include other equipment to send or receive data using other wavelengths or phenomena. For example, the other 608 network interface may include an ultrasonic transceiver used to send data as ultrasonic sounds, a visible light system that communicates by modulating a visible light source such as a light-emitting diode, and so forth. In another example, the other 608 network interface may comprise a wireless wide area network (WWAN) interface or a wireless cellular data network interface. Continuing the example, the other 608 network interface may be compliant with at least a portion of the 3G, 4G, 5G, LTE, or other standards.

The AMD 102 may include one or more of the following sensors 128. The sensors 128 depicted here are provided by way of illustration and not necessarily as a limitation. It is understood that other sensors 128 may be included or utilized by the AMD 102, while some sensors 128 may be omitted in some configurations.

A motor encoder 610 provides information indicative of the rotation or linear extension of a motor 680. The motor 680 may comprise a rotary motor, or a linear actuator. In some implementations, the motor encoder 610 may comprise a separate assembly such as a photodiode and encoder wheel that is affixed to the motor 680. In other implementations, the motor encoder 610 may comprise circuitry to drive the motor 680. For example, the autonomous navigation module 534 may utilize the data from the motor encoder 610 to estimate a distance traveled.

A suspension weight sensor 612 provides information indicative of the weight of the AMD 102 on the suspension system for one or more of the main wheels or the caster wheel. For example, the suspension weight sensor 612 may comprise a switch, strain gauge, load cell, photodetector, or other sensing element that is used to determine whether weight is applied to a particular wheel, or whether weight has been removed from the wheel. In some implementations, the suspension weight sensor 612 may provide binary data such as a "1" value indicating that there is a weight applied to the wheel, while a "0" value indicates that there is no weight applied to the main wheel. In other implementations, the suspension weight sensor 612 may provide an indication such as so many kilograms of force or newtons of force. The suspension weight sensor 612 may be affixed to one or more of the main wheels or the caster wheel. In some situations, the safety module 528 may use data from the suspension weight sensor 612 to determine whether or not to inhibit operation of one or more of the motors 680. For example, if the suspension weight sensor 612 indicates no weight on the suspension, the implication is that the AMD 102 is no longer resting on its wheels, and thus operation of the motors 680 may be inhibited. In another example, if the suspension weight sensor 612 indicates weight that exceeds a threshold value, the implication is that something heavy is resting on the AMD 102 and thus operation of the motors 680 may be inhibited.

One or more bumper switches 614 provide an indication of physical contact between a bumper or other member that is in mechanical contact with the bumper switch 614. The safety module 528 utilizes sensor data 552 obtained by the bumper switches 614 to modify the operation of the AMD 102. For example, if the bumper switch 614 associated with the front of the AMD 102 is triggered, the safety module 528 may drive the AMD 102 backwards.

A floor optical motion sensor (FOMS) 616 provides information indicative of motions of the AMD 102 relative to the floor or other surface underneath the AMD 102. In one implementation, the FOMS 616 may comprise a light source such as light-emitting diode (LED), an array of photodiodes, and so forth. In some implementations, the FOMS 616 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 616 may provide other information, such as data indicative of a pattern present on the floor, composition of the floor, color of the floor, and so forth. For example, the FOMS 616 may utilize an optoelectronic sensor that may detect different colors or shades of gray, and this data may be used to generate floor characterization data.

An ultrasonic sensor 618 utilizes sounds in excess of 20 kHz to determine a distance from the sensor 128 to an object. The ultrasonic sensor 618 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 618 may provide information indicative of a presence of an object, distance to the object, and so forth. Two or more ultrasonic sensors 618 may be utilized in conjunction with one another to determine a location within a two-dimensional plane of the object.

In some implementations, the ultrasonic sensor 618 or portion thereof may be used to provide other functionality. For example, the emitter of the ultrasonic sensor 618 may be used to transmit data and the detector may be used to receive data transmitted that is ultrasonic sound. In another example, the emitter of an ultrasonic sensor 618 may be set to a particular frequency and used to generate a particular waveform such as a sawtooth pattern to provide a signal that is audible to an animal, such as a dog or a cat.

An optical sensor 620 may provide sensor data 552 indicative of one or more of a presence or absence of an object, a distance to the object, or characteristics of the object. The optical sensor 620 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 620 may utilize one or more sensing elements. For example, the optical sensor 620 may comprise a 4×4 array of light sensing elements. Each individual sensing element may be associated with a field of view (FOV) that is directed in a different way. For example, the optical sensor 620 may have four light sensing elements, each associated with a different 10' FOV, allowing the sensor to have an overall FOV of 40'.

In another implementation, a structured light pattern may be provided by the optical emitter. A portion of the structured light pattern may then be detected on the object using a sensor 128 such as an image sensor or camera 644. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 620 may operate as a depth camera, providing a two-dimensional image of a scene, as well as data that indicates a distance to each pixel.

Data from the optical sensors 620 may be utilized for collision avoidance. For example, the safety module 528 and the autonomous navigation module 534 may utilize the sensor data 552 indicative of the distance to an object in order to prevent a collision with that object.

Multiple optical sensors 620 may be operated such that their FOV overlap at least partially. To minimize or eliminate interference, the optical sensors 620 may selectively control one or more of the timing, modulation, or frequency of the light emitted. For example, a first optical sensor 620 may emit light modulated at 60 kHz while a second optical sensor 620 emits light modulated at 63 kHz.

A lidar 622 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 552 may be generated that is indicative of the presence of objects and the relative positions, shapes, and so forth is visible to the lidar 622. Data from the lidar 622 may be used by various modules. For example, the autonomous navigation module 534 may utilize point cloud data generated by the lidar 622 for localization of the AMD 102 within the physical environment.

A mast position sensor 624 provides information indicative of a position of the mast. For example, the mast position sensor 624 may comprise limit switches associated with the mast extension mechanism that indicate whether the mast 112 is in an extended or retracted position. In other implementations, the mast position sensor 624 may comprise an optical code on at least a portion of the mast 112 that is then interrogated by an optical emitter and a photodetector to determine the distance which the mast 112 is extended. In another implementation, the mast position sensor 624 may comprise an encoder wheel that is attached to a mast motor that is used to raise or lower the mast 112. The mast position sensor 624 may provide data to the safety module 528. For example, if the AMD 102 is preparing to move, data from the mast position sensor 624 may be checked to determine if the mast 112 is retracted, and if not, the mast 112 may be retracted prior to beginning movement.

A strain sensor 626 provides information indicative of a strain on a component. For example, the strain sensor 626 may comprise a strain gauge or load cell that measures a displacement of the cable 122, a side-load applied to the mast 112, or a downward pressure on the mast 112, and so forth. The safety module 528 may utilize sensor data 552 obtained by the strain sensor 626. For example, if the strain applied to the mast 122 exceeds a threshold amount, the safety module 528 may direct an audible and visible alarm to be presented by the AMD 102.

A payload weight sensor 628 provides information indicative of the weight associated with the modular payload bay. The payload weight sensor 628 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 628 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 628 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 528 may utilize the payload weight sensor 628 to determine if the modular payload bay has been overloaded. If so, an alert or notification may be issued.

One or more device temperature sensors 630 may be utilized by the AMD 102. The device temperature sensors 630 provide temperature data of one or more components within the AMD 102. For example, a device temperature sensor 630 may indicate a temperature of one or more of the batteries 502, one or more motors 680, and so forth. In the event the temperature exceeds a threshold value, the component associated with that device temperature sensor 630 may be shut down.

One or more interlock sensors 632 may provide data to the safety module 528 or other circuitry that prevents the AMD 102 from operating in an unsafe condition. For example, the interlock sensors 632 may comprise switches that indicate whether an access panel is open. The interlock sensors 632 may inhibit operation of the AMD 102 until the interlock switch indicates a safe condition is present.

A gyroscope 634 may provide information indicative of rotation of an object affixed thereto. For example, gyroscope 634 may generate sensor data 552 that is indicative of a change in orientation of the AMD 102 or portion thereof.

An accelerometer 636 provides information indicative of a direction and magnitude of an imposed acceleration. Data such as rate of change, determination of changes in direction, speed, and so forth may be determined using the accelerometer 636. The accelerometer 636 may comprise mechanical, optical, micro-electromechanical, or other devices. For example, the gyroscope 634 in the accelerometer 636 may comprise a prepackaged solid-state inertial measurement unit (IMU) that provides multiple axis gyroscopes 634 and accelerometers 636.

A magnetometer 638 may be used to determine an orientation by measuring ambient magnetic fields, such as the terrestrial magnetic field. For example, the magnetometer 638 may comprise a Hall effect transistor that provides output compass data indicative of a magnetic heading.

The AMD 102 may include one or more location sensors 640. The location sensors 640 may comprise an optical, radio, or other navigational system such as a global positioning system (GPS) receiver. For indoor operation, the location sensors 640 may comprise indoor position systems, such as using Wi-Fi Positioning Systems (WPS). The location sensors 640 may provide information indicative of a relative location, such as "living room" or an absolute location such as particular coordinates indicative of latitude and longitude, or displacement with respect to a predefined origin.

A photodetector 642 provides sensor data 552 indicative of impinging light. For example, the photodetector 642 may provide data indicative of a color, intensity, duration, and so forth.

A camera 644 generates sensor data 552 indicative of one or more images. The camera 644 may detect light in one or more wavelengths including, but not limited to, terahertz, infrared, visible, ultraviolet, and so forth. For example, an infrared camera 644 may be sensitive to wavelengths between approximately 700 nanometers and 1 millimeter. The camera 644 may comprise charge coupled devices (CCD), complementary metal oxide semiconductor (CMOS) devices, microbolometers, and so forth. The AMD 102 may use image data acquired by the camera 644 for object recognition, navigation, collision avoidance, user communication, and so forth. For example, a pair of cameras 644 sensitive to infrared light may be mounted on the front of the AMD 102 to provide binocular stereo vision, with the sensor data 552 comprising images being sent to the autonomous navigation module 534. In another example, the camera 644 may comprise a 10 megapixel or greater camera that is used for videoconferencing or for acquiring pictures for the user.

The camera 644 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 644, particularly those associated with navigation or autonomous operation, may utilize a global shutter. In other implementations, the camera(s) 644 providing images for use by the autonomous navigation module 534 may be acquired using a rolling shutter and subsequently may be processed to mitigate image artifacts.

One or more microphones 646 may acquire information indicative of sound present in the physical environment. In some implementations, arrays of microphones 646 may be used. These arrays may implement beamforming techniques to provide for directionality of gain. The AMD 102 may use the one or more microphones 646 to acquire information from acoustic tags, accept voice input from users, determine ambient noise level, for voice communication with another user or system, and so forth.

An air pressure sensor 648 may provide information indicative of an ambient atmospheric pressure or changes in ambient atmospheric pressure. For example, the air pressure sensor 648 may provide information indicative of changes in air pressure due to opening and closing of doors, weather events, and so forth.

An air quality sensor 650 may provide information indicative of one or more attributes of the ambient atmosphere. For example, the air quality sensor 650 may include one or more chemical sensing elements to detect the presence of carbon monoxide, carbon dioxide, ozone, and so forth. In another example, the air quality sensor 650 may comprise one or more elements to detect particulate matter in the air, such as the photoelectric detector, ionization chamber, and so forth. In another example, the air quality sensor 650 may include a hygrometer that provides information indicative of relative humidity.

An ambient light sensor 652 may comprise one or more photodetector's or other light-sensitive elements that are used to determine one or more of the color, intensity, or duration of ambient lighting around the AMD 102.

An ambient temperature sensor 654 provides information indicative of the temperature of the ambient environment proximate to the AMD 102. In some implementations, an infrared temperature sensor may be utilized to determine the temperature of another object at a distance.

A floor analysis sensor 656 may include one or more components that are used to generate at least a portion of the floor characterization data. In one implementation, the floor analysis sensor 656 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 656 may be used by one or more of the safety module 528, the autonomous navigation module 534, the task module 536, and so forth. For example, if the floor analysis sensor 656 determines that the floor is wet, the safety module 528 may decrease the speed of the AMD 102 and generate a notification alerting the user.

The floor analysis sensor 656 may include other components as well. For example, a coefficient of friction sensor may comprise a probe that comes into contact with the surface and determines the coefficient of friction between the probe and the floor.

A caster rotation sensor 658 provides data indicative of one or more of a direction of orientation, angular velocity, linear speed of the caster wheel, and so forth. For example, the caster rotation sensor 658 may comprise an optical encoder and corresponding target that is able to determine that the caster assembly transitioned from an angle of 0° at a first time to 49° at a second time.

The sensors 128 may include a radar 660. The radar 660 may be used to provide information as to a distance, lateral position, and so forth, to an object.

The sensors 128 may include a passive infrared (PIR) sensor 662. The PIR sensor 662 may be used to detect the presence of people, pets, hotspots, and so forth. For example, the PIR sensor 662 may detect infrared radiation with wavelengths between 8 and 14 micrometers.

The AMD 102 may include other sensors 664 as well. For example, a capacitive proximity sensor may be used to provide proximity data to adjacent objects. Other sensors 664 may include radio frequency identification (RFID) readers, near field communication (NFC) systems, coded aperture camera, and so forth. For example, NFC tags may be placed at various points within the physical environment to provide landmarks for the autonomous navigation module 534. One or more touch sensors may be utilized to determine contact with a user or other objects.

The AMD 102 may include one or more output devices 132. A motor 680 may be used to provide linear or rotary motion. A light 682 may be used to emit photons. A speaker 684 may be used to emit sound. A display 686 may comprise one or more of a liquid crystal display, light emitting diode display, electrophoretic display, cholesterol display, interferometric display, and so forth. The display 686 may be used to present visible information such as graphics, pictures, text, and so forth. In some implementations, the display 686 may comprise a touchscreen that combines a touch sensor and a display 686.

In some implementations, the AMD 102 may be equipped with a projector 688. The projector 688 may be able to project an image on the surface, such as the floor, wall, ceiling, and so forth.

One or more mast actuators 690 may comprise one or more of a motor, linear actuator, pneumatic device, hydraulic device, and so forth. An actuator controller may be used to provide a signal or other input that operates one or more of the mast actuators 690 to produce movement of the mast 112. For example the actuator 116 may comprise a mast actuator 690 and the actuator controller may comprise the actuator control electronics 118.

A scent dispenser 692 may be used to emit one or more smells. For example, the scent dispenser 692 may comprise a plurality of different scented liquids that may be evaporated or vaporized in a controlled fashion to release predetermined amounts of each.

One or more actuators 694 may comprise an electrically operated mechanism such as one or more of a motor, solenoid, piezoelectric material, electroactive polymer, shape-memory alloy, and so forth. An actuator controller may be used to provide a signal or other input that operates one or more of the actuators 694 to produce movement of at least a portion of the AMD 102.

In other implementations, other 696 output devices may be utilized. For example, the AMD 102 may include a haptic output device that provides output that produces particular touch sensations to the user. Continuing the example, a motor 680 with an eccentric weight may be used to create a buzz or vibration to allow the AMD 102 to simulate the purr of a cat.

The apparatus described in this disclosure may be used in other situations. For example, a stationary device may use the pan and tilt assembly 602 to pan and tilt a component such as a display 686, camera 644, and so forth.

Figure 7:
FIG. 7 illustrates a table that associates particular lengths of the cable with antinoise parameters used to generate the antinoise signal and equalizer parameters used to equalize the intended signal, according to some implementations.

FIG. 7 illustrates a table 700 that associates particular lengths of the cable 122 with antinoise parameters 226 used to generate the antinoise signal 140 and equalizer parameters 218 used to equalize the intended signal 134, according to some implementations. A table 700 is depicted by way of illustration and not necessarily as a limitation. In other implementations other data structures may be used.

The table 700 includes length data 216. The length data 216 may include one or more of the retained length of cable 126 or the deployed length of cable 130. The antinoise parameters 226 may be associated with particular length data 216. The antinoise parameters 226 may include a phase offset 702, an amplitude 704, and so forth. For example, the phase offset 702 indicates a phase delay that is to be introduced between the intended signal 134 and the antinoise signal 140. The amplitude 704 may indicate a value of amplification or attenuation that is used to produce emission of the radiated antinoise signal 140 that is less than or equal in power to the radiated noise 138. For example, if the antinoise signal 140 were more powerful than the radiated noise 138, the antinoise signal 140 would produce a net contribution in electromagnetic noise. The amplitude 704 may be used to control operation of one or more of the signal splitter 220, the phase shifter 224, the signal injector 228, an inline attenuator, and so forth. For example, the amplitude 704 may be used to control the amplitude of the intended signal 134 at the sample output port of the signal splitter 220.

Also depicted are the equalizer parameters 218 that are associated with length data 216. For example, the equalizer parameters 218 may indicate amplification/attenuation 706 that is to be associated with a particular frequency band.

In some implementations data associated with the table 700 may be stored and retrieved during operation. In one implementation, a microcontroller may be used that accepts as input the length data 216 and produces as output one or more of the antinoise parameters 226. For example, the length data 216 may be used as input to a lookup table that retrieves antinoise parameters 226. In other implementations, instead of storing the information in a data structure, one or more circuits may be used. For example, an analog or digital circuit may accept as input the length data 216 and generate a particular phase offset 702.

Figure 8:
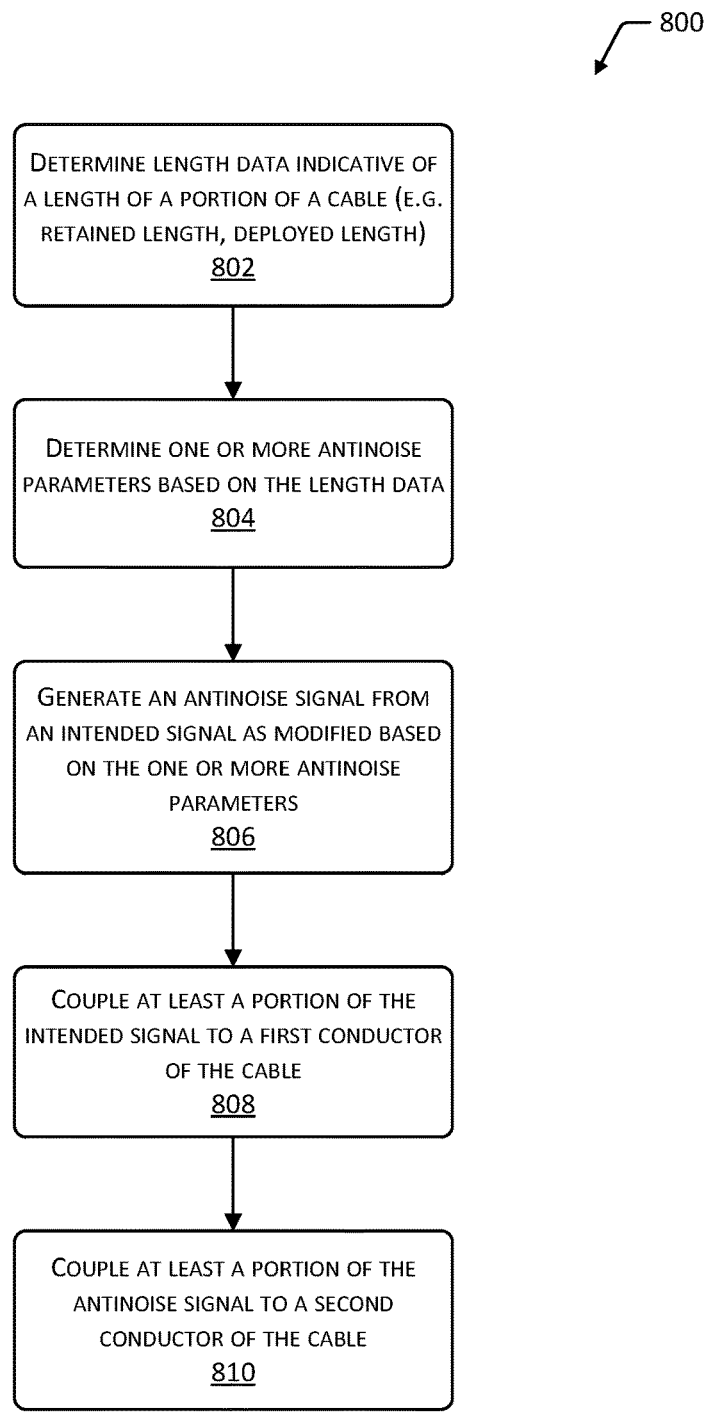
FIG. 8 is a flow diagram of a process to generate an antinoise signal based on a length of cable, according to some implementations.

FIG. 8 is a flow diagram 800 of a process to generate an antinoise signal 140 based on the length data 216 of a cable 122, according to some implementations. The process may be implemented at least in part by the noise cancellation device 136.

At 802 length data 216 is determined. The length data 216 is indicative of a length of a portion of the cable 122. For example, the length data 216 may be indicative of a retained length of cable 126 or a deployed length of cable 130.

The determination of the length of the portion of the cable 122 may use a variety of techniques as described above. In one implementation, the length data 216 may be determined by detecting movement of the cable 122 relative to a sensor 128. In another implementation, the length data 216 may be determined by monitoring operation of an actuator 116 coupled to a structure that displaces the second end of the cable 122 relative to the first end. For example, a lift mechanism may be used to raise and lower the telescoping sections 114 of the mast 112. As the mast 112 moves, the cable 122 moves. Information about the movement of the telescoping sections 114 may be used to determine the length data 216. In yet another implementation, an inductance sensor 422 may be used to determine inductance of one or more conductors in the cable 122. The length data 216 may then be generated that is indicative of the inductance or a length of a portion of the cable 122.

At 804 one or more antinoise parameters 226 are determined based on the length data 216. For example, the deployed length 130 may be used as input to retrieve from a lookup table a phase offset 802 value and an amplitude 804 value.

At 806 an antinoise signal 140 is generated from the intended signal 134 as modified based on the one or more antinoise parameters 226. For example, the phase shifter 224 may generate the antinoise signal 140 by introducing a phase delay to the intended signal 134.

At 808 at least a portion of the intended signal 134 is coupled to a first electrical conductor 202 of the cable 122. For example, an output port from the signal splitter 220 is connected to the center conductor in the coaxial cable 304.

At 810 at least a portion of the antinoise signal 140 is coupled to a second electrical conductor 204 of the cable 122. At least a portion of the antinoise signal 140 as radiated by the second electrical conductor 204 destructively interferes with at least a portion of the radiated noise 138 that is radiated from the first electrical conductor 202.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
    a chassis,
    a battery,
    a first set of electronics;
    an extensible mast having a first end and a second end, wherein the first end is proximate to the chassis;
    a motor coupled to the extensible mast to move the second end of the extensible mast relative to the first end;
    a cable comprising a first electrical conductor and a second electrical conductor, wherein a first end of the cable is connected to the first set of electronics and a second end of the cable is connected to a second set of electronics that are proximate to the second end of the extensible mast;
    a sensor to generate length data indicative of a length of the cable between the first end of the extensible mast and the second end of the extensible mast; and
    the second set of electronics comprising:
        a camera that generates image data;
        a transmitter to accept the image data as input and generate a first signal with a first phase;
        a signal splitter coupled to the transmitter, wherein the signal splitter transfers the first signal to the first electrical conductor and a phase shifter;
        first circuitry to determine a phase offset with respect to the first signal based on the length data;
        wherein the phase shifter generates, a second signal having a second phase that differs from the first phase by the phase offset; and
        a signal injector coupled to the phase shifter, wherein the signal injector transfers the second signal to the second electrical conductor.

2. The device of claim 1, wherein the extensible mast comprises a plurality of telescoping sections; and the sensor comprises one or more of:
    an optical transmitter and an optical sensor,
    a rotary encoder,
    a linear encoder, or
    second circuitry to detect inductance of the cable.

3. The device of claim 1, the second set of electronics further comprising:
    second circuitry to control amplitude of the second signal based on the length data.

4. A device comprising:
    electronic circuitry;
    a cable having a first portion and a second portion, the cable comprising a first electrical conductor and a second electrical conductor, wherein the cable is electrically coupled to the electronic circuitry;
    a cable retention mechanism, wherein the first portion of the cable is retained by the cable retention mechanism; and
    a sensor to generate length data indicative of a length of one or more of the first portion or the second portion of the cable;
    wherein the electronic circuitry:
        generates a first signal having a first phase;
        couples the first signal to the first electrical conductor;
        determines a phase offset value based on the first signal and the length data;
        generates, based on the first signal, a second signal with a second phase that differs from the first phase by the phase offset value; and
        couples the second signal to the second electrical conductor.

5. The device of claim 4, wherein the electronic circuitry that couples the second signal to the second electrical conductor is located between a first end of the cable and a second end of the cable and couples the second signal to the second electrical conductor at a point between the first end and the second end of the cable.

6. The device of claim 4, further comprising:
a first shield arranged coaxially with respect to at least a portion of the first electrical conductor; and
wherein the second electrical conductor is unshielded.

7. The device of claim 4, the sensor comprising one or more of:
a light source and a photodetector,
a rotary encoder,
a linear encoder, or
second electronic circuitry to detect inductance of one or more of the first electrical conductor, the second electrical conductor, or a third electrical conductor of the cable.

8. The device of claim 4, wherein the electronic circuitry:
selectively amplifies one or more frequencies of the first signal based at least in part on the length data.

9. The device of claim 4, wherein the electronic circuitry comprises a digital phase shifter and wherein the length data comprises a digital value.

10. The device of claim 4, wherein the electronic circuitry:
controls an amplitude of the second signal based on the length data.

11. The device of claim 4, further comprising:
an extensible mast having a first end and a second end;
a motor coupled to the extensible mast to move the second end of the extensible mast relative to the first end; and
wherein at least part of the second portion of the cable is within at least a portion of the extensible mast.

12. A device comprising:
electronic circuitry;
a cable having a first portion and a second portion, the cable comprising a first electrical conductor and a second electrical conductor, wherein the cable is electrically coupled to the electronic circuitry;
a cable retention mechanism, wherein the first portion of the cable is retained by the cable retention mechanism; and
wherein the electronic circuitry:
determines a phase offset based on length data indicative of a length of one or more of the first portion or the second portion of the cable;
generates a first signal having a first phase;
couples the first signal to the first electrical conductor;
generates, based on the first signal, a second signal with a second phase that differs from the first phase by the phase offset; and
couples the second signal to the second electrical conductor.

13. The device of claim 12, wherein the electronic circuitry that generates the second signal and couples the second signal to the second electrical conductor is located between a first end of the cable and a second end of the cable and couples the second signal to the second electrical conductor at a point between the first end and the second end of the cable.

14. The device of claim 12, further comprising:
a first shield arranged coaxially with respect to at least a portion of the first electrical conductor; and
wherein the second electrical conductor is unshielded.

15. The device of claim 12, further comprising:
a sensor comprising one or more of:
a light source and a photodetector,
a rotary encoder,
a linear encoder, or
second electronic circuitry that detects inductance of one or more of the first electrical conductor, the second electrical conductor, or a third electrical conductor of the cable; and
third electronic circuitry that determines the length data from output of the sensor.

16. The device of claim 12, wherein the electronic circuitry:
selectively amplifies one or more frequencies of the first signal based at least in part on the length data.

17. The device of claim 12, wherein the electronic circuitry comprises a digital phase shifter and wherein the length data comprises a digital value.

18. The device of claim 12, wherein the electronic circuitry:
controls an amplitude of the second signal based on the length data.

19. The device of claim 12, further comprising:
an extensible mast having a first end and a second end;
a motor coupled to the extensible mast to move the second end of the extensible mast relative to the first end; and
wherein at least part of the second portion of the cable is within at least a portion of the extensible mast.

20. The device of claim 12, further comprising:
an extensible mast having a first end and a second end;
a camera affixed to the second end of the extensible mast; and
wherein at least part of the second portion of the cable is within at least a portion of the extensible mast.

* * * * *